United States Patent
Albinyana et al.

(10) Patent No.: US 10,565,485 B2
(45) Date of Patent: Feb. 18, 2020

(54) SUBSTRATE WITH A FRAGMENTED MARKING THEREON

(71) Applicant: SICPA HOLDING SA, Prilly (CH)

(72) Inventors: Frederic Albinyana, Bussigny (CH); Gael Sannier, Brent (CH); Xavier Schwab, Prilly (CH); Dominique Bethenod, Bulle (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 15/314,397

(22) PCT Filed: Jun. 24, 2014

(86) PCT No.: PCT/EP2014/063302
§ 371 (c)(1),
(2) Date: Nov. 28, 2016

(87) PCT Pub. No.: WO2015/188890
PCT Pub. Date: Dec. 17, 2015

(65) Prior Publication Data
US 2017/0228629 A1    Aug. 10, 2017

Related U.S. Application Data

(60) Provisional application No. 62/010,040, filed on Jun. 10, 2014.

(51) Int. Cl.
*G06K 19/06* (2006.01)
*G06K 7/14* (2006.01)
*G06K 1/12* (2006.01)

(52) U.S. Cl.
CPC ....... *G06K 19/06103* (2013.01); *G06K 1/121* (2013.01); *G06K 7/14* (2013.01);
(Continued)

(58) Field of Classification Search
CPC ............. G06K 19/06103; G06K 1/121; G06K 19/06028; G06K 19/06037; G06K 19/06065
See application file for complete search history.

(56) References Cited

U.S. PATENT DOCUMENTS 3,711,683 A   1/1973  Hamisch
4,504,083 A   3/1985  Devrient et al.
(Continued)

FOREIGN PATENT DOCUMENTS

CN    1598679       3/2005
CN    101068666    11/2007
(Continued)

OTHER PUBLICATIONS

International Search Report issued with respect to application No. PCT/EP2014/063302.
(Continued)

*Primary Examiner* — Thien M Le
*Assistant Examiner* — Asifa Habib
(74) *Attorney, Agent, or Firm* — Muncy, Geissler, Olds & Lowe, P.C.

(57) ABSTRACT

Disclosed is a substrate with a marking thereon. A part of the substrate has a two-dimensional structure attached thereto, and a part of the marking is present on the structure and the other part of the marking is present on the substrate itself.

17 Claims, 7 Drawing Sheets

(52) U.S. Cl.
CPC ..... *G06K 7/1434* (2013.01); *G06K 19/06028* (2013.01); *G06K 19/06037* (2013.01); *G06K 19/06046* (2013.01); *G06K 19/06065* (2013.01)

(56) References Cited

U.S. PATENT DOCUMENTS

| | | | |
|---|---|---|---|
| 4,766,026 A | 8/1988 | Lass et al. | |
| 6,207,240 B1* | 3/2001 | Schoenfeld | B05D 3/06 264/435 |
| 6,447,014 B1* | 9/2002 | Seidl | G06K 7/1434 283/100 |
| 6,733,689 B1* | 5/2004 | Meyer | B41M 5/5227 252/299.01 |
| 7,742,136 B2* | 6/2010 | Umemoto | B41M 3/14 349/115 |
| 2003/0042317 A1 | 3/2003 | Behm et al. | |
| 2003/0161017 A1* | 8/2003 | Hudson | G03H 1/18 359/2 |
| 2004/0217178 A1* | 11/2004 | Lasch | G06K 19/02 235/488 |
| 2004/0220298 A1* | 11/2004 | Kozee | B41M 3/144 523/160 |
| 2005/0116915 A1 | 6/2005 | Nakajima et al. | |
| 2005/0243391 A1* | 11/2005 | Drinkwater | B42D 15/025 359/31 |
| 2006/0257633 A1* | 11/2006 | Inoue | C23C 18/1605 428/195.1 |
| 2008/0124498 A1* | 5/2008 | Cole | B41M 5/267 428/29 |
| 2009/0050610 A1 | 2/2009 | Takamatsu et al. | |
| 2010/0285398 A1* | 11/2010 | Hogerton | G09F 3/0292 430/2 |
| 2011/0158277 A1 | 6/2011 | Yoshizumi et al. | |
| 2013/0183067 A1 | 7/2013 | Degott et al. | |
| 2017/0170233 A1* | 6/2017 | Tsai | H01L 27/20 |
| 2017/0228629 A1* | 8/2017 | Albinyana | G06K 7/14 |

FOREIGN PATENT DOCUMENTS

| | | |
|---|---|---|
| CN | 103119521 | 5/2013 |
| CN | 103606817 | 2/2014 |
| DE | 2613131 | 10/1977 |
| DE | 19501380 | 8/1996 |
| DE | 202013007438 | 9/2013 |
| WO | 2008000755 | 1/2008 |
| WO | 2010115879 | 10/2010 |
| WO | 2011069689 | 6/2011 |
| WO | 2011069690 | 6/2011 |
| WO | 2011069691 | 6/2011 |
| WO | 2011069692 | 6/2011 |

OTHER PUBLICATIONS

Chinese Office Action and Search Report issued in counterpart Chinese Application No. 201480079615.6 dated Sep. 28, 2018 (and English language translation of the Office Action).

* cited by examiner

SUBSTRATE WITH A FRAGMENTED MARKING THEREON

BACKGROUND OF THE INVENTION

1. Field of the Invention

The present invention relates to a substrate that has a fragmented marking thereon and to a method of providing a substrate with a fragmented marking.

2. Discussion of Background Information

Counterfeiting is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks or mono-dimensional code or bi-dimensional code as unique identifier to avoid or at least to limit drastically the existence of fake, diversion and/or counterfeit. Despite the fact that these solutions are useful, also counterfeiters now have access to many advanced technologies that allow them to reproduce or to mimic existing security devices which sometimes are presented as unique identifier.

Another solution which also exists in the field of packaging or as a protection for items or goods and is mainly used for pharmaceuticals packaging are tamper evident structures or void tamper security evident structures which in themselves are not unique identifiers, but serve as indication when these structures have been altered that a manipulation of a packaging or an item or good has occurred. Despite the strong interest to see whether or not a packaging has been subject to manipulation, the main weaknesses of these structures are that they can be reproduced (even if it remains difficult) and their lack of uniqueness and ability to provide track and trace information.

There is then a crucial need to improve the security and avoid fake, diversion or counterfeiting of goods, items or packaging containing valuable products, which must be satisfied. There also is a crucial need to not only protect consumers from not obtaining genuine products, but very often as it could happen in some developing countries, to save people from health problems or even death due to the use of fake medicines. There is then a crucial need to be satisfied to provide unique identifiers useful for authentication, remaining robust and having tamperproof properties.

SUMMARY OF THE INVENTION

The present invention provides a substrate having a marking thereon. A part of the substrate has at least one two-dimensional structure attached (e.g., adhered) thereto, with a part of the marking being present on the at least one structure and the other part of the marking being present on the substrate itself.

In one aspect of the substrate of the present invention, the marking may be present as at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

In another aspect of the substrate, the two-dimensional structure may be present as a label (e.g., as an adhesive layer such as a sticker) and/or may be a porous structure.

In yet another aspect, the two-dimensional structure may have a thickness of from 60 µm to 300 µm and/or may be made of paper and/or a polymeric material.

In a still further aspect, the two-dimensional structure may comprise a color-shift layer on at least a part of its surface that is opposite to the substrate.

In another aspect of the substrate, the marking may have been provided by a printing process such as, e.g., a laser printing process. For example, the intensity of the laser, the scanning speed of the laser beam, the laser pulse duration and the laser pulse frequency may have been varied during the printing process to create different color effects on the marking and/or the substrate.

In another aspect, the marking may be present only on surfaces of the substrate and the structure. Alternatively, at least a part of the marking may completely penetrate the structure. For example, the intensity of the marking process (e.g., laser beam) may be so high and/or the structure may be so weak that at least a part of the marking applied to the structure is visible on the underlying surface of the substrate after the structure is removed from the substrate.

In another aspect of the substrate of the present invention, the substrate may be covered by a varnish, an ink or the like and the marking may be present on the varnish instead directly on the material of the substrate.

In another aspect, the substrate may be made of (or at least comprise) metal, preferably aluminum and/or the substrate may be present as a can or a capsule.

The present invention also provides a method of marking a substrate. The method comprises applying a marking on a portion of the substrate that has a two-dimensional structure attached thereto in such a way that a part of the marking is present on the substrate itself and the other part of the marking is present on the two-dimensional structure.

The present invention also provides a method of improving the protection of an article having a marking thereon against counterfeiting. The method comprises providing a part of the marking on the article itself and providing the other part of the marking on a two-dimensional structure which is affixed to the marking.

BRIEF DESCRIPTION OF THE DRAWINGS

The present invention is further described in the detailed description which follows, in reference to the noted plurality of drawings by way of a non-limiting example of exemplary embodiment of the present invention, in which like reference numerals represent similar parts throughout the several views of the drawings, and wherein:

FIGS. 1 and 1a show a first embodiment of the invention wherein a marking in the form of letters and numbers is printed across a two-dimensional structure and also on parts of the substrate that is not covered by the structure and wherein the two-dimensional structure is removed from the substrate after the marking has been applied (FIG. 1a);

FIGS. 2 and 2a show a second embodiment of the invention wherein a marking in the form of letters and numbers is printed across a two-dimensional structure and also on parts of the substrate that is not covered by the structure and wherein the two-dimensional structure is removed from the substrate after the marking has been applied (FIG. 2a);

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise. For example, reference to "a plastic material" would also mean that mixtures of one or more plastic materials can be present unless specifically excluded.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the disclosure of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

As set forth above, the marked substrate of the present invention such as e.g., an aluminum can has at least one two-dimensional structure such as, e.g., a label attached thereto. The attachment of the structure to the substrate will often be accomplished by means of an adhesive, although other ways of affixing the structure to the substrate are possible as well. The adhesive strength may be such that the structure can be peeled off the substrate manually. However, the adhesive strength is preferably at least high enough that removing the structure is not possible without at least partially destroying the structure and making it unsuitable for further use.

The substrate may be present in any form or shape. It will often be present in the form of a container such as, e.g., a box, a bottle, a can, a capsule, a canister, a cartridge, packaging, etc. It may also be present in the form of a two-dimensional article such as, e.g., a credit card, a passport, an identity card, a driver's license, an access card, a transportation ticket, an event ticket, and a voucher. The material of the substrate is not critical and can be or comprise a material selected from, for example, one or more of metals and metal alloys (preferably aluminum), plastic materials, glass, paper, cardboard, and the like. The substrate may also be completely or partially coated, for example with an optionally transparent and/or colored varnish (e.g. a UV-curable varnish) and/or with some other kind of coating (e.g. protective resin coating). In this case a part of the marking will be present not on the substrate itself but on the coating thereof (or may at least partially penetrate the varnish or coating, in which case at least a part of the marking may also be present on the substrate itself).

The term "two-dimensional structure" as used herein an the appended claims is intended to mean that the thickness of the structure is much smaller than the other two dimensions of the structure. For example, the other dimensions of the structure may be larger than the thickness of the structure by a factor of at least 10, e.g., at least 20 or at least 30. The at least one two-dimensional structure may have any size and shape as long as it is small enough to not cover the substrate completely (to thereby leave room for providing the substrate itself with a part of the marking). The structure may, for example, be rectangular, circular or oval or a free design shape. While the thickness of the two-dimensional structure is not particularly limited, the structure will often have a thickness in the range of from 100 μm to 300 μm, especially if it is present in the form of a label, sticker or the like. The structure may be made of any material that is suitable for providing it with a marking. Often the structure will be made of or comprise a material selected from one or more of paper, plastic materials and metals. The two-dimensional structure will usually be flexible to at least some extent to facilitate its attachment to the substrate. Examples of preferred structures used in the context of the present invention can be selected from adhesive labels or stickers or void structures, with or without color shift properties.

Additionally, the two-dimensional structure may optionally have a coating on at least a part of its surface that is opposite to the substrate. This coating may, for example, be or comprise a material that provides a color shift or other color effect such as, e.g., an interference layer or a chiral liquid crystal polymer (CLCP) layer. A CLCP layer is obtainable, for example, by applying a CLCP precursor composition onto one major surface of the two-dimensional structure or at least a part thereof, optionally heating the applied CLCP precursor composition to promote the chiral liquid crystal state thereof, and curing the precursor composition in the chiral liquid crystal state to form the CLCP layer.

The CLCP precursor composition for making the layer may, for example, comprise at least one nematic compound, at least one chiral dopant, at least one photoinitiator and, optionally, at least one solvent. Non-limiting examples of corresponding compositions are disclosed in, for example, WO 2008/000755, WO 2010/115879, WO 2011/069689, WO 2011/069690, WO 2011/069691, and WO 2011/069692.

By way of background, cholesteric (chiral) liquid crystals exhibit a viewing-angle dependent color. When illuminated with white light the cholesteric liquid crystal structure reflects light of a predetermined color (predetermined wavelength range) which is a function of the employed materials and generally varies with the angle of observation and the device. The precursor material itself is colorless and the observed color (predetermined wavelength range) is only due to a physical reflection effect at the cholesteric helical structure adopted at a given temperature by the liquid crystal material. In particular, in liquid crystal materials the cholesteric helical structure is "frozen" in a predetermined state through polymerization and thus rendered temperature-independent.

The (e.g., machine readable) marking may have been produced by any known printing technique, including conventional printing and digital printing (e.g., by using a laser). For example, the marking may be or comprise a digitally printed (or at least digitally printable) code. Further, the marking may have been produced by two or more different printing methods. For example, a part of the marking may have been produced by digital printing and another part of the marking may have been produced by a conventional printing technique. The various printing methods are known to those of skill in the art and the suitability of a specific printing method depends on, inter alia, the complexity of the marking to be produced. Suitable methods for producing the marking include ink-jet printing (for example, continuous ink-jet printing, drop-on-demand ink-jet printing, or valve jet printing). The industrial ink-jet printers, commonly used for numbering, coding and marking applications on conditioning lines and printing presses, are particularly suitable for this purpose. Preferred ink-jet printers include single nozzle continuous ink-jet printers (also called raster or multi level deflected printers) and drop-on-demand ink-jet printers, in particular valve jet printers. Other conventional printing methods such as, for example, offset, rotogravure, screen printing, letterpress, flexography, intaglio, etc. may also be used and are known to those of skill in the art.

The marking may, for example, comprise cells, dots, microdots, bars, micro alphanumeric characters, glyphs, or any combination of two or more thereof. The marking may comprise, e.g., a cloud of dots, a sum of glyphs, a 1-dimensional barcode, a stacked 1-dimensional barcode, a 2-dimensional barcode, a data matrix, or any combination of two or more thereof. It may also be or comprise an image, a picture, a logo, indicia, and the like.

The marking or at least one or more parts thereof may be formed with, for example, a black ink such as conventional carbon black ink. Of course, inks of a different color may be used as well. The best choice of the color of the ink depends, inter alia, on the color of the background onto which the marking is to be applied (i.e., the color of the optionally coated substrate and the color of the optionally coated two-dimensional structure).

If the marking of the substrate of the present invention is provided by using a laser it is possible to adjust and vary the intensity of the laser or the scanning speed of the laser beam, the laser pulse duration and the laser pulse frequency to obtain special effects and/or additional advantages. For example, the intensity of the laser (e.g., a $CO_2$ laser or a YAG laser) may be such that the marking is only present on the surface of the two-dimensional structure (or on the coating thereof, respectively) and on the surface of the substrate (or the coating thereof, respectively) that is not covered by the two-dimensional structure. Alternatively, it is also possible to adjust the intensity of the laser such that the laser beam penetrates the two-dimensional structure (and an optional adhesive layer) and reaches the surface of the underlying substrate. In the latter case, the marking on the two-dimensional structure or at least a part thereof will be visible on the substrate after the structure is removed therefrom. If this effect is desired and the material of the substrate would require significant laser energy to achieve the effect, it may be more convenient to provide the substrate with a coating or varnish (as described above) that requires less energy to provide a marking thereon. Further, if the laser beam completely penetrates the two-dimensional structure in at least parts thereof this may provide a die cut effect. As a consequence thereof, the structural integrity of the two-dimensional structure may be weakened to an extent at which it is no longer be possible to remove the structure from the substrate (e.g. by peeling) without destroying the structure. Of course, instead of a laser beam other high energy radiation may be used such as, e.g., X-ray or electron beams.

As can be appreciated from the foregoing, according to the present invention the information provided by the marking is fragmented and distributed between the substrate and the two-dimensional structure. This renders it very difficult to reuse the substrate and the two-dimensional structure.

Figure 1:
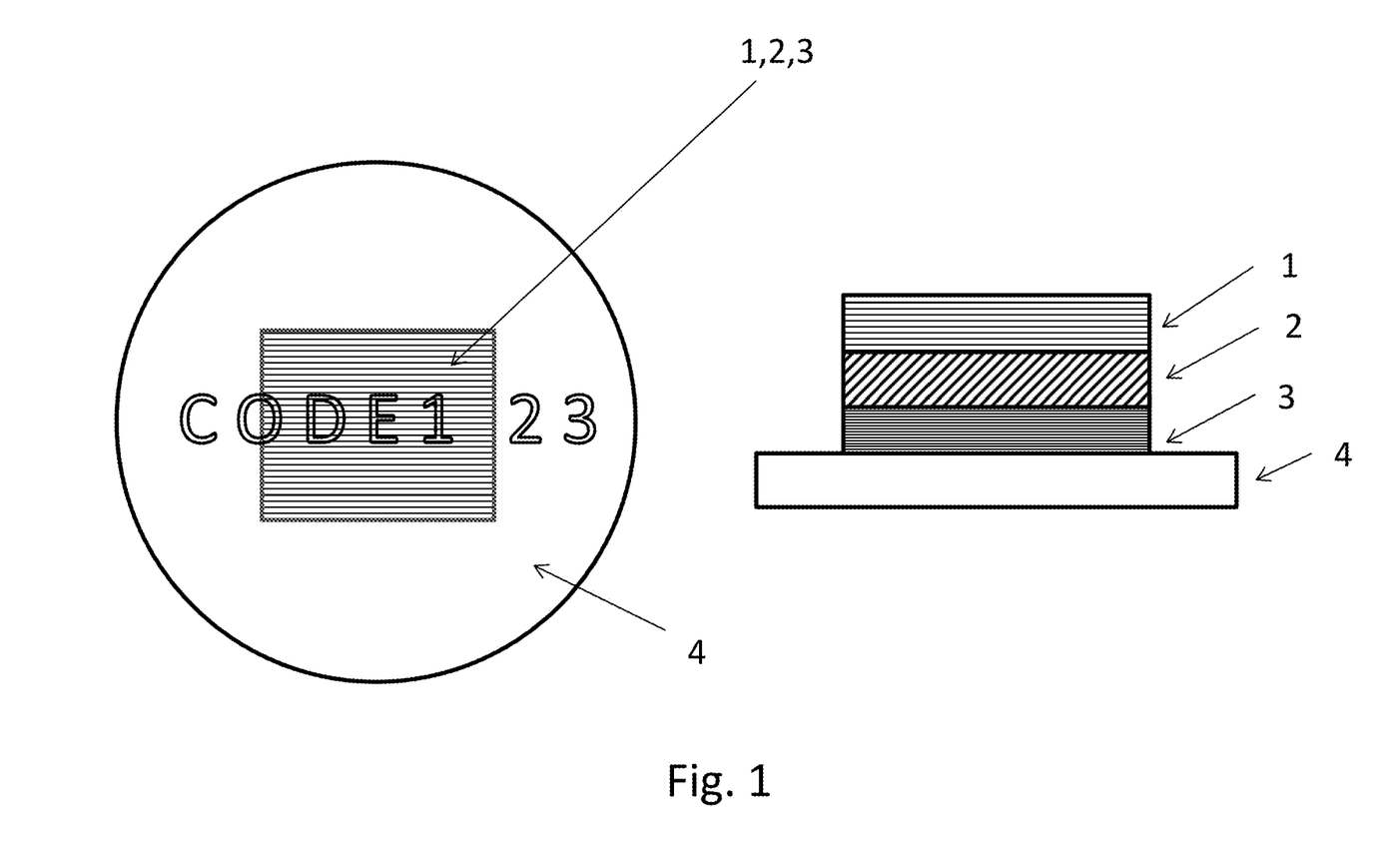

The appended drawings illustrate an embodiment of a substrate according to the present invention. FIGS. 1 and 1a show a substrate 4 such as, e.g., an aluminum can, a paper substrate or a plastic substrate (e.g., made of or comprising PET) having thereon a two-dimensional structure such as e.g., an adhesive label. A marking in the form of a printed code is present both on the substrate 4 itself and on the two-dimensional structure. The cross section of the marked substrate and the two-dimensional structure in FIGS. 1 and 1a shows that the two-dimensional structure consists of an adhesive layer 3, the base material 2 of the two-dimensional structure (e.g., made of a plastic material such as PET) and a coating layer 1 on the base material 2 of two-dimensional structure 2. The coating layer 1 may, for example, be a chiral liquid crystal polymer (CLCP) layer whose color can be changed by irradiating it with a laser beam. As a result, a part of the marking may be present on the coating layer 1 of the two-dimensional structure in the form of a locally different color in the areas thereof in which the laser beam was applied while the remainder of the marking may be present on the substrate 4. Of course, the CLCP layer may be replaced by any other layer that can be used for marking by a high energy beam (preferably a laser beam). For example, layer 1 may be a resin or varnish layer having a dye incorporated therein, which dye changes its color when it is (locally) irradiated by a laser beam. When the two-dimensional structure is removed from the substrate 4 after the marking process, only a part of the marking is still visible on the substrate, as illustrated in FIG. 1a. The remainder of the marking remains on the removed two-dimensional structure.

Figure 2:
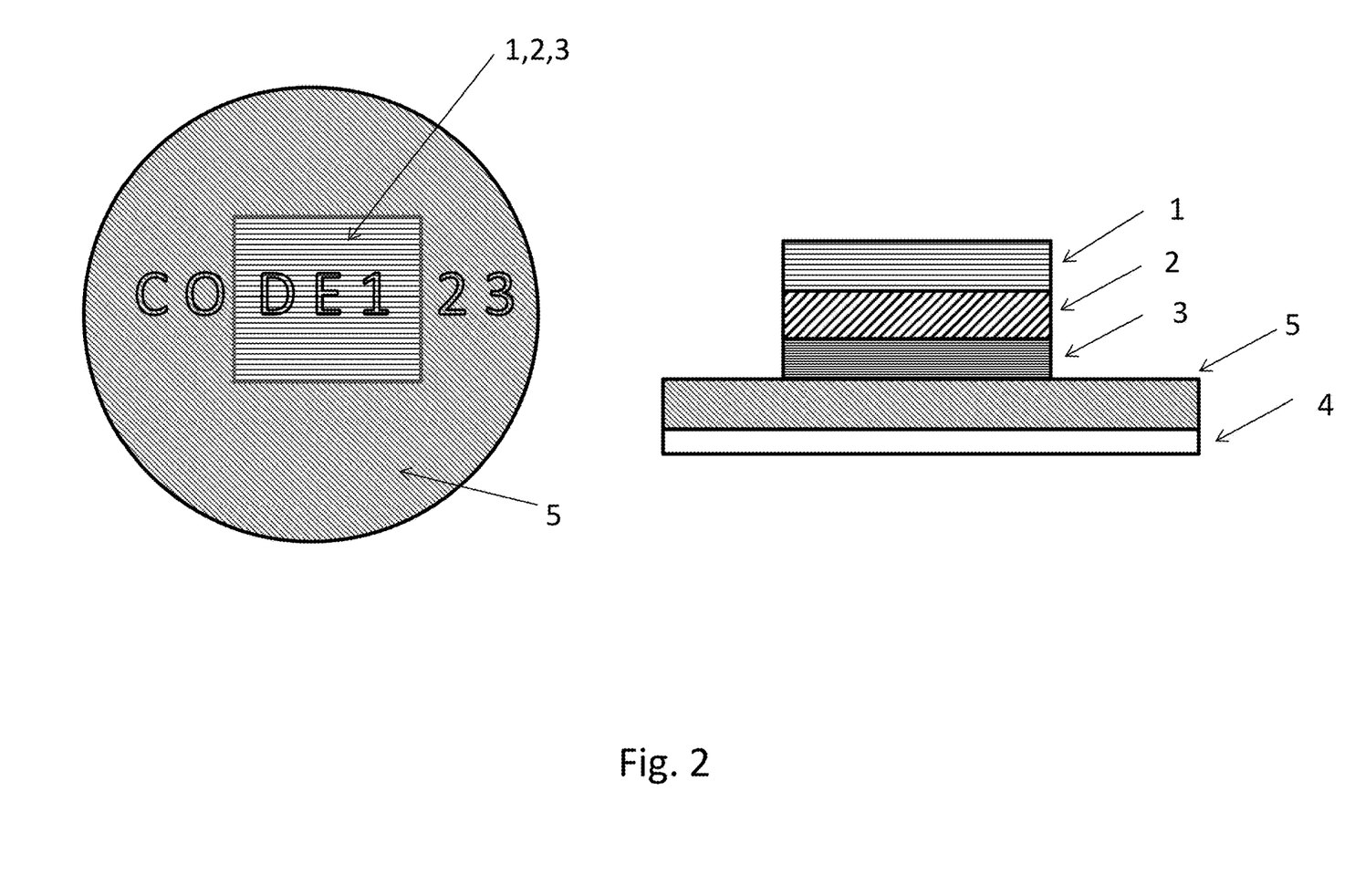

The embodiment shown in FIGS. 2 and 2a is similar to the embodiment of FIGS. 1 and 1a. However, in this case there is an additional layer 5 provided on the substrate 4 (between substrate 4 and adhesive layer 3). Layer 5 may, for example, be a varnish or resin layer comprising a dye which changes its color when it is irradiated by, e.g., a laser beam. In this case the marking will be on the layer 5 instead of on the substrate 4 itself (unless at least a part of the marking penetrates the layer 4 and optionally also layers 1-3, in which case at least a part of the marking will additionally be present on the substrate 4). For example, in this case layer 1 may be made of a resin or varnish containing a first dye which changes its color when it is subjected to a laser beam, and layer 5 may be made of a resin or varnish containing a second dye of the same or a different color as the first dye which changes its color to a color that is different from the changed color of the first dye. As a result, if the two-dimensional structure is removed and replaced by a different two-dimensional structure, the colors do not match, indicating tampering.

Figure 3:
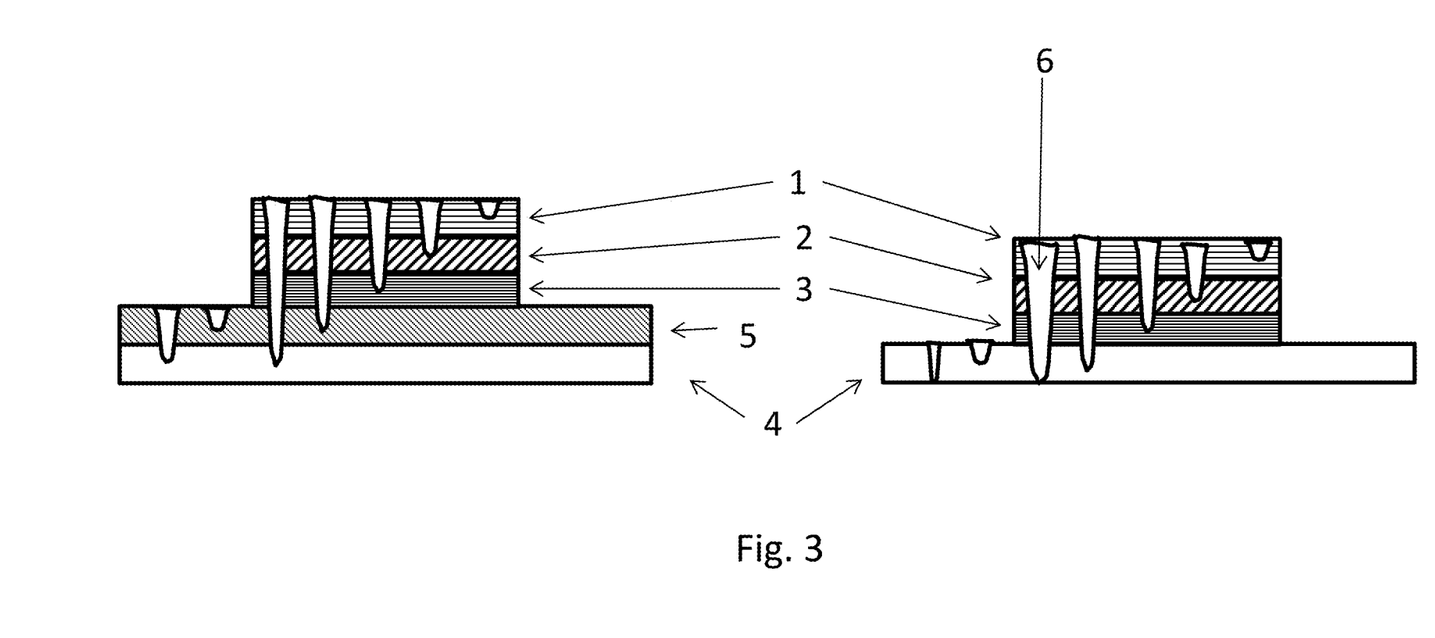
FIG. 3 shows cross sections of the embodiments of FIGS. 1, 1a, 2 and 2a wherein the depth of the marking varies.

FIG. 3 illustrates the effect of varying the intensity (strength) and/or the irradiation time of a laser beam during the marking process on the substrates shown in FIGS. 1 and 2. As can be seen, in this case the penetration depth of the laser beam can be varied, resulting in a marking that may, for example, be present only on the coating layer 1 and on the substrate 4 (in an area thereof that is not covered by the two-dimensional structure) or, in the case of the second embodiment shown in FIG. 2, only on the coating layer 1 and on the layer 5 (in an area thereof that is not covered by the two-dimensional structure). In an extreme case the laser beam may penetrate all layers (1-4 or 1-5, respectively) at least in parts of the two-dimensional structure and/or of the substrate, resulting in a cutting die structure 6.

Figure 4:
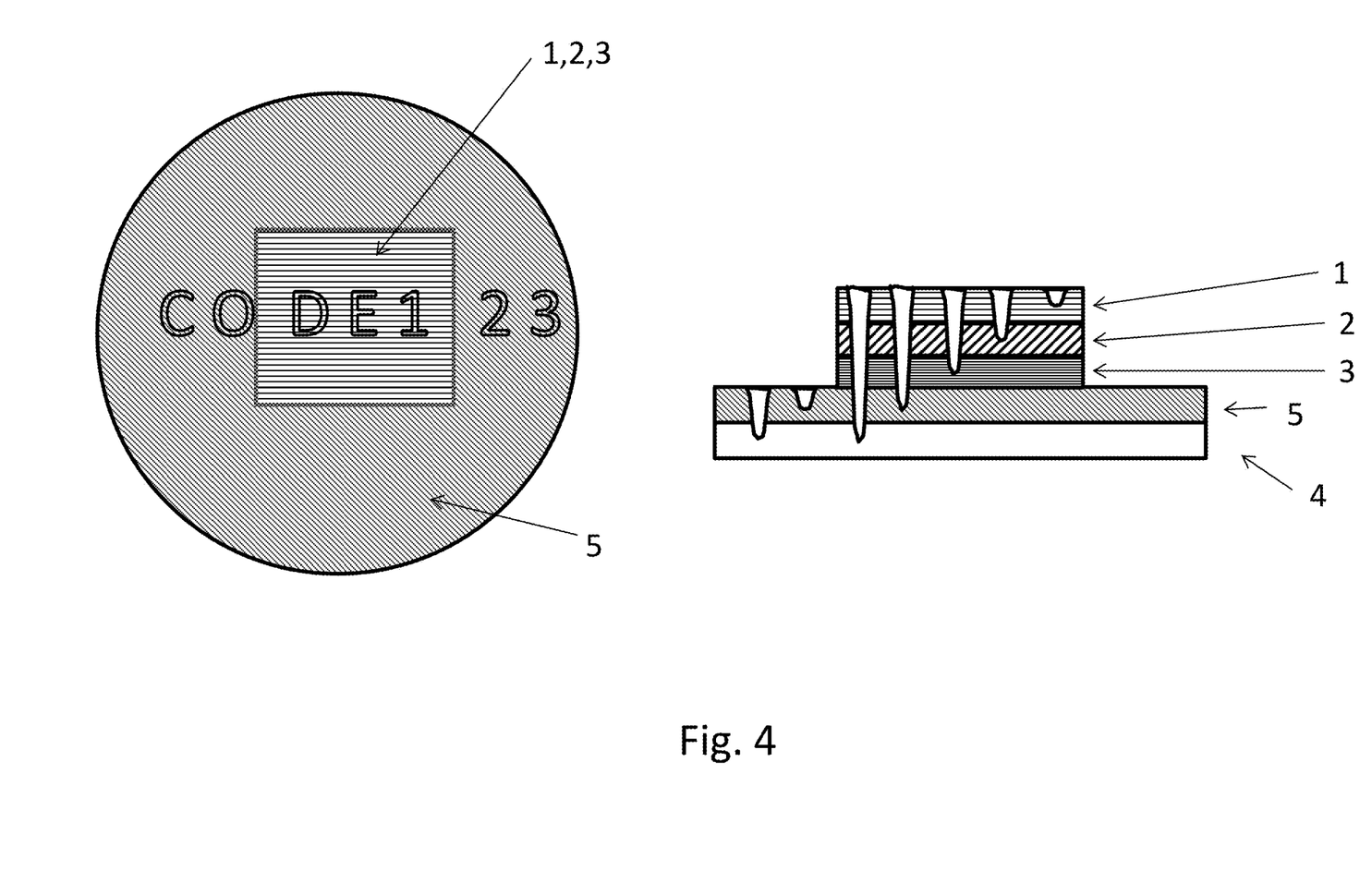
FIGS. 4 and 5 show a cross section of the embodiment of FIGS. 2 and 2a wherein the marking is present with varying depth and wherein the two-dimensional structure is removed from the substrate after the marking has been applied (FIG. 5).
Figure 5:
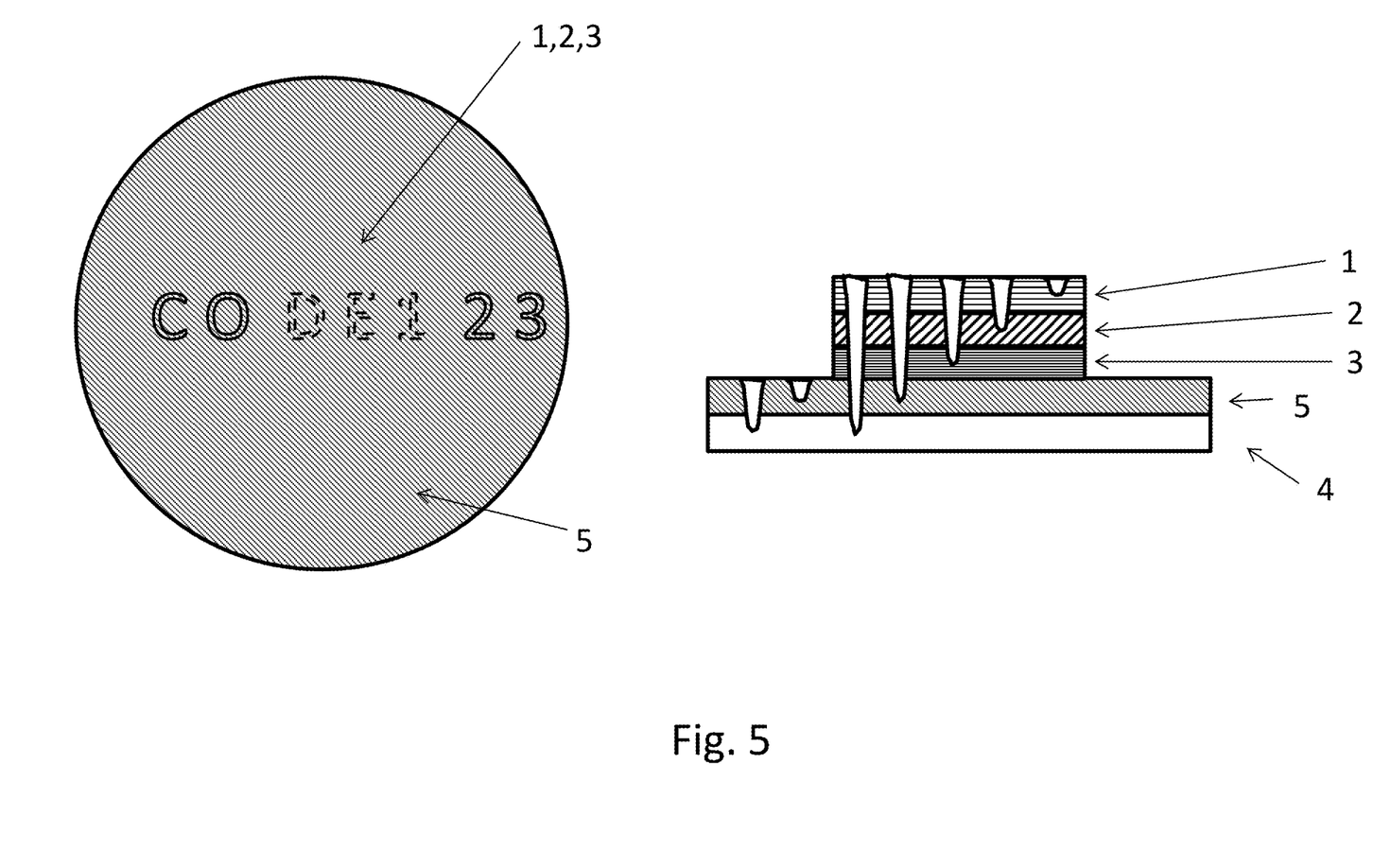

FIGS. 4 and 5 illustrate possible effects of removing the two-dimensional structure from the substrate 4 after at least a part of the laser marking has penetrated the layers 1, 2, 3 (and 1, 2, 3 and 5 in the case of the second embodiment) and has reached the substrate 4. In this case, at least a part of the marking on the two-dimensional structure remains visible on the substrate 4 (or at least the layer 5). Even if the two-dimensional structure is replaced by a new one, the previous marking is still detectable on the substrate 4, evidencing tampering.

The following examples are to further illustrate the present invention.

Example 1 According to FIG. 1

An adhesive label (=two-dimensional structure) is attached to the bottom of an aluminum can (=substrate). The adhesive label consists of three layers as shown in FIG. 1. The adhesive layer 3 is used to fix the label on the can. The label also comprises a PET (polyethylene terephthalate) layer 2. The PET layer is covered by a chiral liquid crystal polymer (CLCP) layer 1 that provides color shift effect upon irradiation (and serves as a security feature). The CLCP layer can be obtained, for example, by depositing by a variable printing technique such as inkjet printing a chiral liquid crystal polymer precursor composition on the PET layer, heating the precursor composition to establish a chiral liquid crystal state and thereafter curing the resultant layer to freeze the CLCP structure. A typical and exemplary precursor composition that may be used for the purposes of the present invention is a follows:

| Composition | Weight % |
|---|---|
| Acetone | 52.25 |
| 2-methyl-1,4-phenylene bis(4-(4-(acryloyloxy)butoxy)benzoate) | 38.8 |
| (3R,3aR,6R,6aR)-hexahydrofuro[3,2-b]furan-3,6-diyl bis(4-(4-(acryloyloxy)benzoyloxy)-3-methoxybenzoate) | 7.5 |
| Irgacure 907 | 1.0 |
| LiClO$_4$ | 0.45 |

After having fixed the adhesive label on the bottom of the can a laser such as the CO$_2$ Laser (Macsa) having a wavelength of 10600 nm is used to provide a marking in the form of the alphanumeric characters "CODE123" on a part of the bottom of the can and on a part of the label attached thereto, as shown in FIG. 1. The scanning speed of the laser is about 2000 mm/s and its output is 30 W. Removing the label from the can will result in the disappearance of a part of the marking, as show in FIG. 1a, thereby evidencing tampering. If the marking is present in the form of a 2D barcode instead of the alphanumeric characters shown in FIG. 1, removal of the label will result in a removal of a part of the barcode, rendering it impossible to read the barcode.

Example 2 According to FIG. 2/FIG. 5

The adhesive label used is the same as that used in Example 1, but the substrate is a can that has been covered (functionalized) by a layer 5 made of varnish (containing or not containing a dye sensitive to irradiation by a laser beam). The laser used for the marking is a laser such as the CO$_2$ Laser (Macsa) having a wavelength of 10600 nm. The scanning speed and/or the output of the laser for providing the marking are varied during the marking, which allows to engrave the marking with different depths, thereby penetrating the various layers to a different degree in different areas and resulting in a cutting die structure at least in parts of the marking, as shown in FIG. 5. Upon removal of the label at least a part of the marking that is present on the label will also still be visible on the substrate (or at least on the layer 5, which is the main difference between the present embodiment and the embodiment shown in FIG. 1a. If a counterfeiter covers the substrate with a new label in order to conceal the removal of the original label, the marking on the original label will still be detectable on the layer 5 (and optionally also on the substrate itself).

It is noted that the foregoing examples have been provided merely for the purpose of explanation and is in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An article having a marking thereon, comprising:
    the article, and
    a two-dimensional structure attached to a part of the article, wherein a part of the marking is present on the two-dimensional structure and another part of the marking is present on the article itself,
    wherein the part of the marking, which is present on the two-dimensional structure, completely penetrates the two-dimensional structure, such that
    the part of the marking, which completely penetrates the two-dimensional structure, is visible on an underlying surface of the article after the two-dimensional structure is removed from the article.

2. The article of claim 1, wherein the marking is present as at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

3. The article of claim 1, wherein the two-dimensional structure is present as at least one of a label or sticker.

4. The article of claim 1, wherein the two-dimensional structure has a thickness of from 60 μm to 300 μm.

5. The article of claim 1, wherein the two-dimensional structure is made of at least one of paper and a polymeric material.

6. The article of claim 1, wherein at least a part of the marking has been produced by a laser.

7. The article of claim 6, wherein an intensity of the laser has been varied to create different color effects on at least one of: the marking and the article.

8. The article of claim 1, wherein the marking is present only on surfaces of the article and the two-dimensional structure.

9. The article of claim 1, wherein a surface of the article is covered by a varnish and the marking is present on the varnish.

10. The article of claim 1, wherein the article is made of metal.

11. The article of claim 10, wherein the article is made of aluminum.

12. The article of claim 1, wherein the article is present as a can or a capsule.

13. The article of claim 1, wherein the two-dimensional structure comprises a color-shift layer on at least a part of a surface of the two-dimensional structure that is opposite to the article.

14. A method of providing an article with a marking, comprising:
    applying the marking on a portion of the article that has a two-dimensional structure attached thereto so that a part of the marking is present on the article itself and another part of the marking is present on the two-dimensional structure,
    wherein the part of the marking, which is present on the two-dimensional structure, completely penetrates the two-dimensional structure such that
    the part of the marking, which completely penetrates the two-dimensional structure, is visible on an underlying surface of the article after the two-dimensional structure is removed from the article.

15. The method of claim 14, wherein the two-dimensional structure comprises a color-shift layer on at least a part of a surface of the two-dimensional structure that is opposite to the article.

16. A method of improving the protection of an article having a marking thereon against counterfeiting, comprising:
    providing a part of the marking on the article itself and providing another part of the marking on a two-dimensional structure which is affixed to the article,
    wherein the part of the marking, which is provided on the two-dimensional structure, completely penetrates the two-dimensional structure such that
    the part of the marking, which completely penetrates the two-dimensional structure, is visible on an underlying surface of the article after the two-dimensional structure is removed from the article.

17. The method of claim 16, wherein the two-dimensional structure comprises a color-shift layer on at least a part of a surface of the two-dimensional structure that is opposite to the article.

* * * * *